United States Patent
Zhang et al.

(10) Patent No.: US 9,847,908 B2
(45) Date of Patent: Dec. 19, 2017

(54) RESOURCE MANAGEMENT METHOD AND MANAGEMENT SERVER

(71) Applicant: Huawei Technologies Co., Ltd., Shenzhen (CN)

(72) Inventors: Yi Zhang, Shenzhen (CN); Chuxiong Zhang, Nanjing (CN); Jie Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 14/599,883

(22) Filed: Jan. 19, 2015

(65) Prior Publication Data
US 2015/0134792 A1 May 14, 2015

Related U.S. Application Data

(63) Continuation of application No. PCT/CN2012/078953, filed on Jul. 20, 2012.

(51) Int. Cl.
| | |
|---|---|
| *G06F 15/177* | (2006.01) |
| *H04L 12/24* | (2006.01) |
| *H04L 29/08* | (2006.01) |
| *G06F 9/50* | (2006.01) |
| *H04N 21/231* | (2011.01) |

(52) U.S. Cl.
CPC ........ *H04L 41/0816* (2013.01); *G06F 9/5083* (2013.01); *H04L 41/50* (2013.01); *H04L 67/1002* (2013.01); *H04N 21/23103* (2013.01)

(58) Field of Classification Search
None
See application file for complete search history.

(56) References Cited

U.S. PATENT DOCUMENTS

| | | | | |
|---|---|---|---|---|
| 6,553,420 B1 * | 4/2003 | Karger | ................. | G06F 9/5027 709/216 |
| 7,594,016 B1 | 9/2009 | Zhou et al. | | |
| 2003/0069972 A1 * | 4/2003 | Yoshimura | .......... | H04L 12/4645 709/226 |
| 2005/0102398 A1 | 5/2005 | Zhang et al. | | |
| 2005/0228856 A1 | 10/2005 | Swildens et al. | | |

(Continued)

FOREIGN PATENT DOCUMENTS

| | | |
|---|---|---|
| CN | 101778005 A | 7/2010 |
| CN | 102438049 A | 5/2012 |

*Primary Examiner* — Viet Vu
*Assistant Examiner* — James Edwards
(74) *Attorney, Agent, or Firm* — Huawei Technologies Co., Ltd.

(57) ABSTRACT

The present invention relates to the field of a resource management method and a server. The resource management method includes: acquiring, by a management server, a first stable ratio used to indicate a quantitative ratio of at least two types of servers in a CSP during stable interaction; and increasing quantities of the at least two types of servers in the CSP according to the first stable ratio. By applying the present invention, a management server on a CSP increases the quantities of all types of servers at one time according to a stable ratio. This enables all types of servers to quickly reach a stable state, and improves overall processing capabilities of all types of servers, thereby further enhancing quality of service of an application deployed on the CSP.

14 Claims, 3 Drawing Sheets

(56) References Cited

U.S. PATENT DOCUMENTS

| | | |
|---|---|---|
| 2011/0154340 A1 | 6/2011 | Kanemasa |
| 2011/0213997 A1 | 9/2011 | Kansal et al. |
| 2011/0239010 A1 | 9/2011 | Jain et al. |
| 2012/0254443 A1* | 10/2012 | Ueda .................. H04L 67/1008 709/226 |
| 2013/0144990 A1 | 6/2013 | Gao et al. |
| 2013/0152080 A1* | 6/2013 | Sachindran ......... G06F 9/44526 718/1 |

* cited by examiner

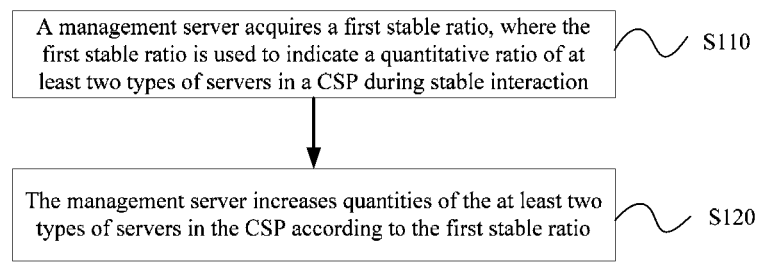
FIG. 1
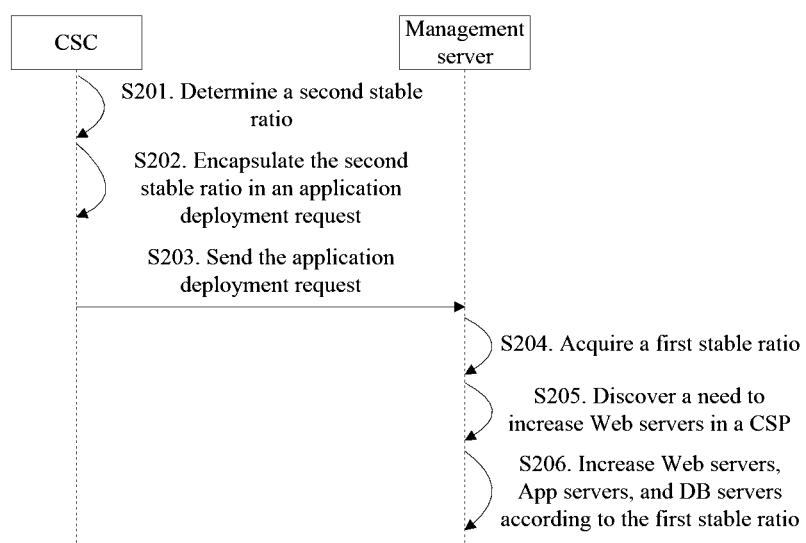
FIG. 2.a

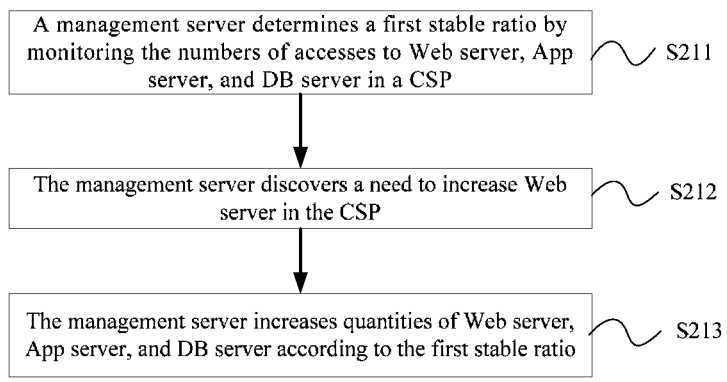
FIG. 2.b
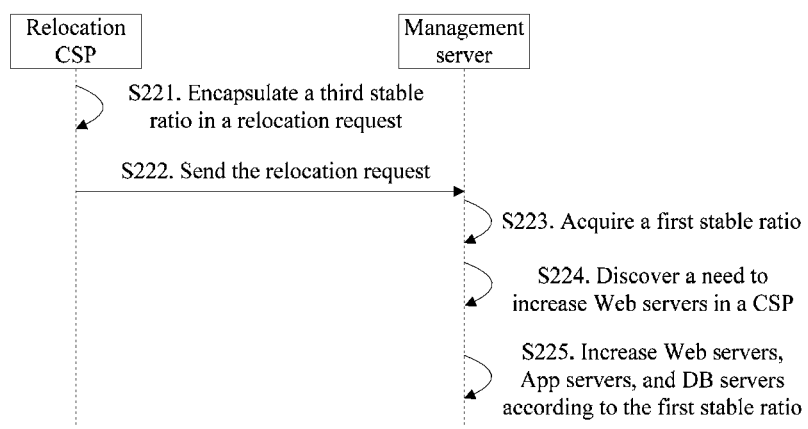
FIG. 2.c

RESOURCE MANAGEMENT METHOD AND MANAGEMENT SERVER

CROSS-REFERENCE TO RELATED APPLICATIONS

This application is a continuation of International Patent Application No. PCT/CN2012/078953, filed on Jul. 20, 2012, which is hereby incorporated by reference in its entirety.

TECHNICAL FIELD

The present invention relates to the field of communications technologies, and in particular, to a resource management method and a management server.

BACKGROUND

Cloud computing provides a service delivery and consumption mode. A cloud service provider (CSP) uses a network to connect a large number of computing resources and performs unified management, allocation, and scheduling to constitute a huge computing resource pool so as to provide services for cloud service consumers (CSC). Generally speaking, cloud services are roughly classified into three tiers, namely, infrastructure as a service (IaaS, also called tier I), platform as a service (PaaS, also called tier P), and software as a service (SaaS, also called tier S). At present, most cloud service providers in the industry are tier I providers (such as Amazon). In IaaS, a CSC consumes only infrastructure capabilities provided by a CSP, such as computing, storage, and network transmission. Therefore, the CSC must provide a corresponding platform and software application, while the CSP provides tier I services for the CSC by means of a virtual machine.

An application deployed on the CSP generally has architecture with multiple tiers of servers. For example, a Web application deployed on the CSP has a typical three-tier architecture: a Web server tier, an application (App) server tier, and a database (DB) server tier. Servers at each tier may be regarded as one type of servers. Each tier may include multiple servers and each server corresponds to one virtual machine (VM). In the prior art, when the CSP finds by monitoring that a tier is faced up with lots of operations, the CSP increases a quantity of servers at this tier to implement load distribution. Accordingly, servers at other tiers, which are associated with the servers at this tier, will also be faced up with lots of operations. Therefore, quantities of servers at other tiers also need to be increased to implement load distribution. The prior art implements load distribution by adding servers one by one in the servers at the tiers. In the present invention, servers at each tier are one type of servers.

The inventor finds that the foregoing prior art has at least the following disadvantages: Adding servers one by one at different tiers to implement load distribution may cause that, when servers at one tier are faced up with lots of operations, more operations are required on servers at other tiers, which are associated with the servers at this tier, and therefore heavier computing pressure is caused and multiple servers need to be added. Each time a virtual machine corresponding to one server is added, some time is required. Therefore, in a process of adding servers one by one at the tiers, some operation requests on the servers at the tiers may have expired, which causes poor quality of service of an application deployed on the CSP.

For example, when a large number of accesses crowd into the Web application deployed on the CSP, CPU utilization ratio of a Web server will suddenly increase. Because an App server and a DB server are responsible for service logic processing and data addition, deletion, query and modification respectively, computing pressure on the App server and the DB server is much heavier than that on the Web server. Therefore, multiple App servers and DB servers need to be added to process these sudden crowded requests. At present, the CSP adds servers one by one at the App server tier and the DB server tier. Because it takes some time to add servers, in the process of adding servers one by one at the App server tier and the DB server tier, some requests at the Web server tier may have expired, which lowers the quality of service of the Web application on the CSP.

SUMMARY

Embodiments of the present invention provide a resource management method and a management server, so as to improve quality of service of an application deployed on a CSP.

An embodiment of the present invention provides a resource management method, including:

acquiring, by a management server, a first stable ratio, where the first stable ratio is used to indicate a quantitative ratio of at least two types of servers in a CSP during stable interaction; and increasing, by the management server, quantities of the at least two types of servers in the CSP according to the first stable ratio.

An embodiment of the present invention provides a management server, including:

an acquiring module, configured to acquire a first stable ratio, where the first stable ratio is used to indicate a quantitative ratio of at least two types of servers in a CSP during stable interaction; and an increasing module, configured to increase quantities of the at least two types of servers in the CSP according to the first stable ratio.

It can be seen from the foregoing technical solutions in the embodiments of the present invention that, when discovering a need to increase a quantity of servers at one tier, a management server may increase quantities of servers at all tiers in a CSP at one time according to a stable ratio, which enables the servers at all tiers to quickly reach a stable state. The so-called stable state means that, when the quantities of servers at all tiers satisfy a specific ratio, the servers at the tiers are in a stable interaction state to implement load distribution. This avoids expiration of some operation requests on the servers at the tiers due to a relatively long time required to add servers one by one, improves an overall processing capability of servers at each tier, and further enhances quality of service of an application deployed on the CSP.

BRIEF DESCRIPTION OF DRAWINGS

To illustrate the technical solutions according to the embodiments of the present invention more clearly, the accompanying drawings for describing the embodiments are introduced briefly in the following: Apparently, the accompanying drawings in the following description merely show some embodiments of the present invention, and persons of ordinary skill in the art may still derive other drawings from these accompanying drawings without creative effort.

FIG. 1 is a flowchart of a resource management method according to an embodiment of the present invention;

FIG. 2.*a* is a flowchart of a method for determining a stable ratio according to an embodiment of the present invention;

FIG. 2.*b* is a flowchart of a method for determining a stable ratio according to another embodiment of the present invention;

FIG. 2.*c* is a flowchart of a method for determining a stable ratio according to still another embodiment of the present invention.

DESCRIPTION OF EMBODIMENTS

Figure 3:
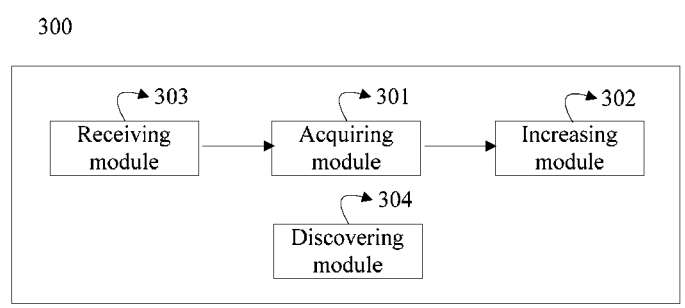
FIG. 3 is a structural diagram of a management server according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

FIG. 1 describes a resource management method according to an embodiment of the present invention. A cloud service provider CSP includes at least two types of servers and a management server. It should be additionally noted that resources mentioned in the present invention refer to server resources. The embodiment specifically includes the following steps:

S110. The management server acquires a first stable ratio, where the first stable ratio is used to indicate a quantitative ratio of the at least two types of servers in the CSP during stable interaction.

Furthermore, before the management server acquires the first stable ratio, the method further includes:

receiving an application deployment request which carries a second stable ratio and is sent by a cloud service consumer CSC, where the second stable ratio is used to indicate a quantitative ratio of a first type of servers to a second type of servers in the CSC during stable interaction, the second stable ratio is implemented by adding a stable-ratio description field to an open virtualization format OVF, and the cloud service consumer CSC may be understood as a test environment.

In the present invention, the open virtualization format (OVF) is adopted to describe the application deployment request. As defined by the standard organization DMTF (Distributed Management Task Force), the OVF describes an open, secure, transplantable, efficient, and scalable software packaging and delivery format running on a virtual machine. An OVF file describes information on virtual resources required by an application, including virtual machine configuration, an operating system and software on the virtual machine, and the like. An existing OVF standard defines the following fields and their meanings (only a part of fields are listed):

Envelop
Reference . . . Reference to other files in the Package
DiskSection . . . Description of a Disk-related attribute
NetWorkSection . . . Description of a Network-related attribute
VirtualSystemCollection . . . Collection of VMs
   ResourceAllocationSection . . . Description of resources required in the Collection
   AnnotationSection . . . Annotation
   ProductSection . . . Description of software information in VMs
VirtualSystem . . . Description of VMs
   VirtualHardwareSection . . . Description of virtual hardware resources of VMs
   AnnotationSection . . . Annotation
   ProductSection . . . Description of software information in VMs
. . .

In the present invention, the stable-ratio description field is added to the OVF. For example, under the Envelop field of the OVF, a field StableRatioSection is added to describe the stable ratio. Specifically, the following description manner may be adopted:

<StableRatioSection ovf: id="string">
<Ratio OVF:id="VirtualSystemCollectionRef">Integer</Ratio>
<Ratio OVF:id="VirtualSystemCollectionRef">Integer</Ratio>
<Ratio OVF:id="VirtualSystemCollectionRef">Integer</Ratio>
<StableRatioSection>

Where, VirtualSystemCollectionRef indicates reference to the field VirtualSystemCollection in the OVF standard. Because VirtualSystemCollection indicates a collection of virtual machines VMs and may correspond to a description of "tier" in the present invention, VirtualSystemCollection may refer to a collection of a type (or a tier) of servers. Therefore, the foregoing description manner describes a stable ratio composed of three types of servers.

It should be noted that the present invention does not pose any limitation on a field under which the stable-ratio description field is added.

For example, a Web application that has a typical three-tier architecture including a Web server tier, an App server tier, and a DB server tier is used as an example. When a stable ratio of Web servers, App servers, and DB servers is 1:2:4, the stable ratio in the OVF is described as follows:

<StableRatioSection ovf:id="stableratio1">
<Ratio OVF:id="web tier">1</Ratio>
<Ratio OVF:id="app tier">2</Ratio>
<Ratio OVF:id="db tier">4</Ratio>
<StableRatioSection>

In addition, the second stable ratio is determined by the CSC, and specifically, may be determined by using the following method: recording, by the CSC, a product value of a quantity of each type of servers in the at least two types of servers and a CPU utilization ratio of this type of servers when the numbers of accesses to the at least two types of servers in the CSC are the same; and determining, by the CSC, a ratio of the product values corresponding to the at least two types of servers as the second stable ratio.

After acquiring the second stable ratio, the management server acquires the first stable ratio as follows:

The management server acquires the first stable ratio according to the second stable ratio, which specifically includes: when a computing capability ratio of the at least two types of servers in the CSC is different from a computing capability ratio of the at least two types of servers in the CSP, acquiring the first stable ratio according to the second stable ratio, the computing capability ratio of the at least two types of servers in the CSC, and the computing capability ratio of the at least two types of servers in the CSP, where the first stable ratio is used to indicate the quantitative ratio of the at least two types of servers in the CSP during stable interaction; or, when a computing capability ratio of the at least two types of servers in the CSC is the same as a computing capability ratio of the at least two types of servers in the CSP, using the second stable ratio as the first stable ratio.

In another embodiment of the present invention, that the management server acquires the first stable ratio specifically includes:

monitoring, by the management server, the numbers of accesses to the at least two types of servers in the CSP;

recording, by the management server, the product value of the quantity of each type of servers in the at least two types of servers and the CPU utilization ratio of this type of servers when the numbers of accesses to the at least two types of servers in the CSC are the same; and determining, by the management server, the ratio of the product values corresponding to the at least two types of servers as the first stable ratio.

In another embodiment of the present invention, before the management server acquires the first stable ratio, the method further includes:

receiving a relocation request which carries a third stable ratio and is sent by a relocation CSP, where the third stable ratio is implemented by adding the stable-ratio description field to the open virtualization format OVF, the third stable ratio is used to indicate a quantitative ratio of the at least two types of servers in the relocation CSP during stable interaction, and the relocation CSP refers to a CSP whose resources need to be relocated.

Likewise, in the present invention, the open virtualization format (OVF) is adopted to describe the relocation request.

After acquiring the third stable ratio, the management server acquires the first stable ratio as follows:

The management server acquires the first stable ratio according to the third stable ratio, which specifically includes: when a computing capability ratio of the at least two types of servers in the relocation CSP is different from the computing capability ratio of the at least two types of servers in the CSP, acquiring the first stable ratio according to the third stable ratio, the computing capability ratio of the at least two types of servers in the relocation CSP, and the computing capability ratio of the at least two types of servers in the CSP; or, when a computing capability ratio of the at least two types of servers in the relocation CSP is the same as the computing capability ratio of the at least two types of servers in the CSP, using the third stable ratio as the first stable ratio.

S120. The management server increases quantities of the at least two types of servers in the CSP according to the first stable ratio.

Furthermore, before the management server increases the quantities of the at least two types of servers in the CSP according to the first stable ratio, the method further includes:

discovering, by the management server, a need to increase one type of servers in the at least two types of servers in the CSP.

In the resource management method provided in the embodiment of the present invention, increasing quantities of servers at all tiers in a CSP according to a stable ratio enables the servers at all tiers to quickly reach a stable state. The so-called stable state means that, when the quantities of servers at all tiers satisfy a specific ratio, the servers at the tiers are in a stable interaction state to implement load distribution. This avoids expiration of some operation requests on the servers at all tiers due to a relatively long time required to add servers one by one, improves an overall processing capability of servers at each tier, and further enhances quality of service of an application deployed on the CSP.

FIG. 2.a, FIG. 2.b, and FIG. 2.c describe three methods for acquiring a stable ratio according to embodiments of the present invention. The embodiments corresponding to the three figures are based on an assumption that a Web application is deployed on a CSP and that the Web application has a typical three-tier architecture including a Web server tier, an App server tier, and a DB server tier. Furthermore, it is assumed that a first type of servers is Web servers, a second type of servers is App servers, and a third type of servers is DB servers. Therefore, the CSP includes Web servers, App servers, and DB servers. In this case, a first stable ratio is used to indicate a quantitative ratio of the Web servers, the App servers, and the DB servers in the CSP during stable interaction.

FIG. 2.a describes a method for determining a stable ratio according to an embodiment of the present invention. Specifically, the embodiment includes the following steps:

S201. A CSC determines a second stable ratio, where the second stable ratio is used to indicate a quantitative ratio of Web servers, App servers, and DB servers in the CSC during stable interaction.

Specifically, the Web servers, the App servers, and the DB servers in the CSC may be understood as servers in a test and development state. When the numbers of accesses to the Web servers, the App servers, and the DB servers in the CSC are the same, the CSC records values of $n_1f_1$, $n_2f_2$, and $n_3f_3$, where $n_1$ indicates a quantity of Web servers at this moment, $f_1$ indicates a CPU utilization ratio of the Web servers at this moment, $n_2$ indicates a quantity of App servers at this moment, $f_2$ indicates a CPU utilization ratio of the App servers at this moment, $n_3$ indicates a quantity of DB servers at this moment, and $f_3$ indicates a CPU utilization ratio of the DB servers at this moment.

After determining the values of $n_1f_1$, $n_2f_2$, and $n_3f_3$, the CSC determines a ratio of the recorded values of $n_1f_1$, $n_2f_2$, and $n_3f_3$ as the second stable ratio.

A specific deduction process of using the ratio of the values of $n_1f_1$, $n_2f_2$, and $n_3f_3$ as the second stable ratio in the present invention is as follows:

Three server tiers of a Web application all include one or multiple servers and load balancing is adopted between these servers for load sharing. Therefore, CPU utilization ratios of servers at a same tier are similar. It is assumed that a CPU utilization ratio of a server is f and a quantity of servers at this tier is n. The total number y of CPU resources consumed by the Web application at this tier is nf.

When a system is in a stable state, the CPU utilization ratios of all servers increase in an almost-linear manner as the number of accesses increases. It is assumed that, where there is no access, a CPU utilization ratio of a server is u and a gradient is k. When the number of accesses is x, f is:

$$f = u + xk \quad (1)$$

Because u can be ignored relative to a CPU utilization ratio occupied by the application, equation (1) can be simplified as:

$$f = xk \quad (2)$$

Because gradients of CPU utilization ratio curves of servers at a same tier are similar and gradients of CPU utilization ratio curves of servers at different tiers are different, the total number of CPU resources consumed by servers at a same tier is:

$$y = n \times k \quad (3)$$

Therefore, when the number of accesses is x, a ratio of the total number of CPU resources consumed at the Web server tier, the total number of CPU resources consumed at the application server tier, and the total number of CPU resources consumed at the database server tier (expressed by $y_w$, $y_a$, and $y_d$ respectively) is:

$$y_w{:}y_a{:}y_d = n_1 k_1{:}n_2 k_2{:}n_3 k_3 \quad (4)$$

Based on equation (2), equation (4) can be simplified as:

$$y_w{:}y_a{:}y_d = n_1 \frac{f_1}{x_1} : n_2 \frac{f_2}{x_2} : n_3 \frac{f_3}{x_3} \quad (5)$$

When the numbers of accesses are the same (that is, $x_1=x_2=x_3$), $f_1$, $f_2$, and $f_3$ are recorded. In this case, equation (5) can be simplified as:

$$y_w{:}y_a{:}y_d = n_1 f_1{:}n_2 f_2{:}n_3 f_3 \quad (6)$$

This ratio is a stable ratio of the three tiers of servers of the Web application in the CSC, that is, the second stable ratio. In a test, the CSC only needs to record the values of $n_1 f_1$, $n_2 f_2$, and $n_3 f_3$ when the numbers of accesses are the same, so as to acquire the second stable ratio by using equation (6).

It should be noted that the foregoing using the ratio of the values of $n_1 f_1$, $n_2 f_2$, and $n_3 f_3$ as the second stable ratio cannot be regarded as a limitation on a method for calculating a second stable ratio, and any other reasonable method for calculating a second stable ratio is applicable to the present invention.

S202. The CSC encapsulates the second stable ratio in an application deployment request.

Specifically, the CSC may encapsulate the second stable ratio in the application deployment request in an OVF format. In the present invention, an OVF file format is adopted to describe information on all virtual resources required by an application in a CSP, including virtual machine configuration, an operating system on a virtual machine, and the like.

Because the OVF format in an existing standard does not define a marker describing the second stable ratio, the present invention defines a new field to describe the second stable ratio in an OVF marker in the existing standard, for example:

<StableRatioSection ovf:id="stableratio1">
<Ratio OVF:id="web tier">1</Ratio>
<Ratio OVF:id="app tier">2</Ratio>
<Ratio OVF:id="db tier">4</Ratio>
</StableRatioSection> where, web tier marks Web servers, app tier marks App servers, and db tier marks DB servers. Therefore, a second stable ratio described by the foregoing OVF language indicates that a quantitative ratio of Web servers, App servers, and DB servers added in the CSC is 1:2:4.

It should be noted that the present invention does not pose any limitation on a marker language of the second stable ratio.

S203. The CSC sends the application deployment request carrying the second stable ratio to a management server.

S204. The management server acquires a first stable ratio.

The management server acquires the first stable ratio according to the second stable ratio, which specifically includes: comparing, by the management server after receiving the second stable ratio carried in the application deployment request, a computing capability ratio of Web servers, App servers, and DB servers in the CSC with a computing capability ratio of Web servers, App servers, and DB servers in the CSP.

When the computing capability ratio of the Web servers, the App servers, and the DB servers in the CSC is different from the computing capability ratio of the Web servers, the App servers, and the DB servers in the CSP, the first stable ratio is determined according to the second stable ratio, the computing capability ratio of the Web servers, the App servers, and the DB servers in the CSC, and the computing capability ratio of the Web servers, the App servers, and the DB servers in the CSP.

For example, the embodiment provides a method for determining a second stable ratio, including: A computing capability w of a computer may be estimated according to a dominant frequency (H) of a CPU and a quantity of Cores (c), that is, w=h*c. It is assumed that computing capabilities of the Web servers and the App servers in the CSC (which may be understood as a test environment) are both 1 (1 GHz and one Core) and a computing capability of the DB servers is 2 (1 GHz and two Cores). Then, the computing capability ratio is 1:1:2. In addition, it is assumed that computing capabilities of the Web servers, the App servers, and the DB servers in the CSP are all 2 (1 GHz and two Cores). Then, the computing capability ratio is 1:1:1, which is different from the computing capability ratio in the CSC. It is assumed that the second stable ratio acquired by the management server is 1:2:4. Because the computing capability ratio of the Web servers and the App servers in the CSP is still 1:1, which is the same as the computing capability ratio of the Web servers and the App servers in the CSC, the quantitative ratio of the Web servers and the App servers is still 1:2 in the first stable ratio. However, because the computing capability ratio of App servers to DB servers needs to be changed to 1:1 in the CSP from 1:2 in the CSC, that is, a computing capability of each DB server in the CSP is dropped by half relative to the computing capability of each App server, and a quantity of DB servers in the CSP accordingly needs to be doubled relative to the quantity of App servers to keep the stable state. Therefore, a quantitative ratio of App servers to DB servers in the CSP needs to be changed to 2:8 from 2:4 in the CSC to reach the stable state. As a result, the quantitative ratio of App servers to DB servers is 2:8 in the first stable ratio, and therefore the first stable ratio is 1:2:8.

It should be noted that the foregoing is one method for determining the first stable ratio in the CSP, and any effective and reasonable method for calculating a first stable ratio is applicable to the present invention.

When the computing capability ratio of the Web servers, the App servers, and the DB servers in the CSC is the same as the computing capability ratio of the Web servers, the App servers, and the DB servers in the CSP, the second stable ratio is used as the first stable ratio.

S205. The management server discovers a need to increase quantities of Web servers in the CSP.

Specifically, the management server may monitor the Web servers in the CSP and, when it is discovered that a CPU utilization ratio of one Web server exceeds a set threshold, it is necessary to increase quantities of Web servers for load distribution.

S206. The management server increases quantities of Web servers, App servers, and DB servers according to the first stable ratio. For example, if the first stable ratio is 1:2:4, the management server adds two App servers and four DB servers according to the first stable ratio while adding one Web server. Therefore, adding multiple App servers or DB servers at one time can effectively shorten time for adding servers, effectively avoid a condition of expiration of some requests on the Web servers, and improve working efficiency of the App servers and the DB servers, thereby further improving working efficiency of the Web servers and improving quality of service of the Web application on the CSP.

FIG. 2.*b* describes a method for determining a stable ratio according to another embodiment of the present invention. Specifically, the embodiment includes the following steps:

S211. A management server determines a first stable ratio by monitoring the numbers of accesses to Web servers, App servers, and DB servers in a CSP.

Specifically, when the numbers of accesses to the Web servers, the App servers, and the DB servers in the CSP are the same, the management server records values of $n_1f_1$, $n_2f_2$, and $n_3f_3$, where $n_1$ indicates a quantity of Web servers at this moment, $f_1$ indicates a CPU utilization ratio of the Web servers at this moment, $n_2$ indicates a quantity of App servers at this moment, $f_2$ indicates a CPU utilization ratio of the App servers at this moment, $n_3$ indicates a quantity of DB servers at this moment, and $f_3$ indicates a CPU utilization ratio of the DB servers at this moment.

The management server determines a ratio of the values of $n_1f_1$ $n_2f_2$, and $n_3f_3$ as the first stable ratio.

Specifically, for a deduction process of using the ratio of the values of $n_1f_1$, $n_2f_2$, and $n_3f_3$ as the first stable ratio, reference may be made to the process in S201 in the embodiment corresponding to FIG. 2.*a*, and details are not described herein again.

S212. The management server discovers a need to increase quantities of Web servers in the CSP.

Specifically, the management server may monitor the Web servers in the CSP and, when it is discovered that a CPU utilization ratio of one Web server exceeds a set threshold, it is necessary to increase quantities of Web servers for load distribution.

S213. The management server increases quantities of Web servers, App servers, and DB servers according to the first stable ratio. For example, if the first stable ratio is 1:2:4, the management server adds two App servers and four DB servers according to the first stable ratio while adding one Web server. Therefore, adding multiple App servers or DB servers at one time can effectively shorten time for adding servers, effectively avoid a condition of expiration of some requests on the Web servers, and improve working efficiency of the App servers and the DB servers, thereby further improving working efficiency of the Web servers and improving quality of service of the Web application on the CSP.

FIG. 2.*c* describes a method for determining a stable ratio according to another embodiment. In the embodiment, a relocation CSP refers to a CSP whose resources need to be relocated and a Web application in the relocation CSP has a stable ratio state of Web servers, App servers, and DB servers. In the present invention, a quantitative ratio of Web servers, App servers, and DB servers in the relocation CSP in a stable state is called a third stable ratio. Specifically, the embodiment includes the following steps:

S221. The relocation CSP encapsulates the third stable ratio in a relocation request.

The third stable ratio in the relocation CSP may be calculated according to a stable ratio of all types of servers in the CSC, where the stable ratio is carried in an application deployment request sent by the CSC, or may be acquired by monitoring a quantitative ratio of all types of local servers in the stable state. Specifically, the two acquiring methods correspond to the acquiring methods described in the embodiments corresponding to FIG. 2.*a* and FIG. 2.*b* respectively. In this case, the relocation CSP may be regarded as the CSP in the embodiments corresponding to FIG. 2.*a* and FIG. 2.*b*, which means that the second stable ratio acquired in FIG. 2.*a* and FIG. 2.*b* is the third stable ratio in this embodiment, and details are not described herein again.

After acquiring the third stable ratio, the relocation CSP encapsulates the third stable ratio in the relocation request in an OVF format, which is implemented by adding a stable-ratio description field to the open virtualization format OVF. It should be noted that the present invention does not pose any limitation on a marker language for describing the second stable ratio and any marker language that can describe the second stable ratio is applicable to the present invention.

S222. The relocation CSP sends the relocation request carrying the third stable ratio to a management server.

S223. The management server acquires a first stable ratio.

The management server acquires the first stable ratio according to the third stable ratio, which specifically includes: comparing, by the management server after receiving the third stable ratio carried in the relocation request, a computing capability ratio of Web servers, App servers, and DB servers in the relocation CSP with a computing capability ratio of Web servers, App servers, and DB servers in a CSP where the management server is located.

When the computing capability ratio of the Web servers, the App servers, and the DB servers in the relocation CSP is different from the computing capability ratio of the Web servers, the App servers, and the DB servers in the CSP where the management server is located, the first stable ratio is determined according to the third stable ratio, the computing capability ratio of the Web servers, the App servers, and the DB servers in the relocation CSP, and the computing capability ratio of the Web servers, the App servers, and the DB servers in the CSP where the management server is located. For a specific method for determining the first stable ratio, reference may be made to the determining step in S204 in the embodiment corresponding to FIG. 2.*a* and details are not described herein again.

When the computing capability ratio of the Web servers, the App servers, and the DB servers in the relocation CSP is the same as the computing capability ratio of the Web servers, the App servers, and the DB servers in the CSP where the management server is located, the third stable ratio is used as the first stable ratio.

S224. The management server discovers a need to increase quantities of Web servers in the CSP.

Specifically, the management server may monitor the Web servers in the CSP and, when it is discovered that a CPU utilization ratio of one Web server exceeds a set threshold, it is necessary to increase quantities of Web servers for load distribution.

S225. The management server increases quantities of Web servers, App servers, and DB servers according to the first stable ratio. For example, if the first stable ratio is 1:2:4, the management server adds two App servers and four DB servers according to the first stable ratio while adding one Web server. Therefore, adding multiple App servers or DB servers at one time can effectively shorten time for adding servers, effectively avoid a condition of expiration of some requests on the Web servers, and improve working efficiency of the App servers and the DB servers, thereby further improving working efficiency of the Web servers and improving quality of service of the Web application on the CSP.

It should be noted that, although the embodiments corresponding to FIG. 2.a, FIG. 2.b, and FIG. 2.c use the three-tier architecture of the Web application deployed in the CSP as an example, it cannot be understood as a limitation of the present invention on dividing servers of the Web application according to any other architecture or a limitation on deploying any other application on the CSP according to a certain division. Any application deployed on the CSP falls within the protection scope of the present invention as long as the application allows division of server tiers based on a certain architecture.

FIG. 3 describes a structure of a management server 300 according to an embodiment of the present invention. A cloud service provider CSP includes at least two types of servers and the management server 300. The management server 300 includes:

an acquiring module 301, configured to acquire a first stable ratio, where the first stable ratio is used to indicate a quantitative ratio of the at least two types of servers in the CSP during stable interaction; and an increasing module 302, configured to increase quantities of the at least two types of servers in the CSP according to the first stable ratio acquired by the acquiring module 301.

In an embodiment of the present invention, the management server 300 further includes:

a receiving module 303, configured to receive an application deployment request which carries a second stable ratio and is sent by a cloud service consumer CSC, where the second stable ratio is implemented by adding a stable-ratio description field to an open virtualization format OVF and the second stable ratio is used to indicate a quantitative ratio of the at least two types of servers in the CSC during stable interaction.

The CSC may encapsulate the second stable ratio in the application deployment request in the OVF format, which is implemented by adding the stable-ratio description field to the open virtualization format OVF. In addition, the second stable ratio is acquired through a test by the CSC. A specific process of acquiring the second stable ratio through a test by the CSC is the same as the process in S201 in the embodiment described in FIG. 2.a and details are not described herein again.

After the receiving module 303 acquires the second stable ratio, the acquiring module 301 is specifically configured to acquire the first stable ratio according to the second stable ratio, which specifically includes:

when a computing capability ratio of the at least two types of servers in the CSC is different from a computing capability ratio of the at least two types of servers in the CSP, acquiring the first stable ratio according to the second stable ratio, the computing capability ratio of the at least two types of servers in the CSC, and the computing capability ratio of the at least two types of servers in the CSP, where the first stable ratio is used to indicate the quantitative ratio of the at least two types of servers in the CSP during stable interaction, and reference may be made to the method for acquiring a first stable ratio in S204 in the embodiment described in FIG. 2.a for a specific method for acquiring a first stable ratio and details are not described herein again; or when a computing capability ratio of the at least two types of servers in the CSC is the same as a computing capability ratio of the at least two types of servers in the CSP, using the second stable ratio as the first stable ratio.

Optionally, in another embodiment of the present invention, the acquiring module 301 is specifically configured to:

monitor the numbers of accesses to the at least two types of servers in the CSP;

record a product value of a quantity of each type of servers in the at least two types of servers and a CPU utilization ratio of this type of servers when the numbers of accesses to the at least two types of servers in the CSC are the same, and determine a ratio of the product values corresponding to the at least two types of servers as the first stable ratio.

Optionally, in another embodiment of the present invention, the management server 300 further includes:

the receiving module 303, further configured to receive a relocation request which carries a third stable ratio and is sent by a relocation CSP, where the third stable ratio is implemented by adding the stable-ratio description field to the open virtualization format OVF and the third stable ratio used to indicate a quantitative ratio of the at least two types of servers in the relocation CSP during stable interaction.

The relocation CSP may encapsulate the third stable ratio in the relocation request in the OVF format, which is implemented by adding the stable-ratio description field to the open virtualization format OVF.

After the receiving module 303 acquires the third stable ratio, the acquiring module 301 is specifically configured to acquire the first stable ratio according to the third stable ratio, which specifically includes:

when a computing capability ratio of the at least two types of servers in the relocation CSP is different from a computing capability ratio of the at least two types of servers in the CSP, acquiring the first stable ratio according to the third stable ratio, the computing capability ratio of the at least two types of servers in the relocation CSP, and the computing capability ratio of the at least two types of servers in the CSP, where the first stable ratio is used to indicate the quantitative ratio of the at least two types of servers in the CSP during stable interaction, and reference may be made to the method for acquiring a first stable ratio in S223 in the embodiment described in FIG. 2.c for the specific method for acquiring a first stable ratio and details are not described herein again; or when a computing capability ratio of the at least two types of servers in the relocation CSP is the same as a computing capability ratio of the at least two types of servers in the CSP, using the third stable ratio as the first stable ratio.

Furthermore, in the foregoing three embodiments, the management server 300 further includes:

a discovering module 304, configured to discover a need to increase one type of servers in the at least two types of servers in the CSP. Specifically, the discovering module 304 may monitor the at least two types of servers in the CSP and, when it is discovered that a CPU utilization ratio of one type of servers exceeds a set threshold, it is necessary to increase this type of servers for load distribution.

According to the management server provided in the foregoing embodiment of the present invention, when discovering a need to increase a quantity of servers at one tier, increases quantities of servers at all tiers at one time according to a stable ratio. This enables the servers at all tiers to quickly reach a stable state, avoids expiration of some operation requests on the servers at all tiers due to a relatively long time required to add servers one by one, and improves an overall processing capability of servers at each tier, thereby further enhancing quality of service of an application deployed on the CSP A person of ordinary skill in the art can understand that all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (ROM), or a random access memory (RAM), and the like.

Specific examples are used to illustrate principles and implementation manners of the present invention. The descriptions of the embodiments are merely intended to help understand the method of the present invention. Meanwhile, persons of ordinary skill in the art may make modifications to specific implementation manners and application ranges according to the idea of the present invention. In conclusion, the content of the specification shall not be construed as a limitation to the present invention.

What is claimed is:

1. A method for resource allocation by a management server in a cloud service provider (CSP), comprising:
    receiving an application deployment request comprising a first ratio of each server type of at least two server types, wherein the first ratio is a ratio of quantities for each server type;
    obtaining a ratio of computing capability of each server type of the at least two server types according to a dominant frequency of a CPU and a quantity of cores of each server type in the CSP;
    determining first optimal ratio of server types of the at least two server types to satisfy the application deployment request based on the first ratio for servers and based on the ratio of computing capabilities of each server type; and
    allocating servers to the application based on the first optimal ratio of server types for the application.

2. The method according to claim 1, wherein the obtaining a ratio of computing capability of each server type of the at least two server types in the CSP comprises:
    obtaining, based on the computing capability of each server type of the at least two server types, the ratio of computing capability of each server type of the at least two server types in the CSP.

3. The method according to claim 1, further comprising:
    obtaining a ratio of computing capability of each server type of the at least two server types in the CSC.

4. The method according to claim 3, wherein the obtaining a ratio of computing capability of each server type of the at least two server types in the CSC is based on a numbers of accesses to the at least two server types allocated to the application.

5. The method according to claim 4, further comprising:
    recording, for each server type a product of which a quantity of a server type times a CPU utilization ratio of the server type.

6. The method according to claim 3, wherein the obtaining a ratio of computing capability of each server type of the at least two server types in the CSC includes based on the product of each server type, a ratio of computing capability of each server type of the at least two server types in the CSC.

7. The method according to claim 3, wherein the obtaining a ratio of computing capability of each server type of the at least two server types in the CSC comprises obtaining from the application deployment request the ratio of computing capability of each server type of the at least two server types in the CSC.

8. The method according to claim 1, wherein determining the first optimal ratio of server types for the at least two server types comprises:
    determining the first optimal ratio of server types for the at least two server types to satisfy the application deployment request based on the first ratio configured of each server type the servers and based on the ratio of computing capabilities of each server type and based on the ratio of computing capability of each server type of the at least two server types in the CSC.

9. A management server, comprising;
    a processor;
    a computer readable storage medium memory for storing computer instructions for execution by the processor, the computer instructions that, when executed by the processor, prompt the processor to:
        receive an application deployment request comprising a first ratio of each server type of at least two server types, wherein the first ratio is a ratio of quantities for each server type;
        obtain a ratio of computing capability of each server type of the at least two server types according to a dominant frequency of a CPU and a quantity of cores of each server type in the CSP;
        determine first optimal ratio of server types of the at least two server types to satisfy the application deployment request based on the first ratio for servers and based on the ratio of computing capabilities of each server type; and
        allocate servers to the application based on the first optimal ratio of server types for the application two server types.

10. The management server according to claim 9, wherein the computer instructions further include instructions to obtain, based on the computing capability of each server type of the at least two server types, the ratio of computing capability of each server type of the at least two server types in the CSP.

11. The management server according to claim 9, wherein the computer instructions further include instructions to obtain a ratio of computing capability of each server type of the at least two server types in the CSC.

12. The management server according to claim 11, wherein the computer instructions include instructions to:
    monitor a number of accesses to the at least two server types;
    record for each server type, a product of which a quantity of a server type times a CPU utilization ratio of the server type; and
    obtain based on the produce of each server type, a ratio of computing capability of each server type of the at least two server types in the CSC.

13. The management server according to claim 11, wherein the programming includes instructions to obtain a ratio of computing capability of each server type of the at least two server types in the CSC comprises instructions to:
    obtain from the application deployment request the ratio of computing capability of each server type of the at least two server types in the CSC.

14. The management server according to claim 9, wherein the programming instructions to determine the first optimal ratio of server types for the at least two server types comprises instructions to:
    determine, based on the first ratio configured of each server type the servers and based on the ratio of computing capabilities of each server type and based on the ratio of computing capability of each server type of the at least two server types in the CSC, the first optimal ratio of server types for the at least two server types to satisfy the application deployment request.

\* \* \* \* \*